(12) United States Patent
Chang et al.

(10) Patent No.: US 12,099,289 B2
(45) Date of Patent: Sep. 24, 2024

(54) OPTICAL DRIVING ASSEMBLY

(71) Applicant: Changzhou AAC Raytech Optronics Co., Ltd., Changzhou (CN)

(72) Inventors: Wesley Chang, Shenzhen (CN); Ryan Lee, Shenzhen (CN); Krane Chen, Shenzhen (CN); Manson Su, Shenzhen (CN); Roger Liu, Shenzhen (CN); Chloe Liao, Shenzhen (CN); Prudence Huang, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 517 days.

(21) Appl. No.: 17/566,737

(22) Filed: Dec. 31, 2021

(65) Prior Publication Data

US 2023/0033567 A1 Feb. 2, 2023

(30) Foreign Application Priority Data

Jul. 27, 2021 (CN) .......................... 202110851914.9

(51) Int. Cl.
| | |
|---|---|
| *G03B 5/00* | (2021.01) |
| *H04N 23/54* | (2023.01) |
| *H04N 23/55* | (2023.01) |
| *H04N 23/68* | (2023.01) |

(52) U.S. Cl.
CPC .............. *G03B 5/00* (2013.01); *H04N 23/54* (2023.01); *H04N 23/55* (2023.01); *H04N 23/687* (2023.01); *G03B 2205/0007* (2013.01); *G03B 2205/0076* (2013.01)

(58) Field of Classification Search
CPC .............. G03B 5/00; G03B 2205/0007; G03B 2205/0076; G03B 2205/0038; G03B 3/10; H04N 23/54; H04N 23/55; H04N 23/687; H04N 23/57; G02B 27/646; G02B 7/026; G02B 7/09; G02B 7/08
See application file for complete search history.

(56) References Cited

U.S. PATENT DOCUMENTS

| | | | | |
|---|---|---|---|---|
| 2023/0007176 | A1* | 1/2023 | Wang | H04M 1/0264 |
| 2023/0022701 | A1* | 1/2023 | Li | H04M 1/0264 |
| 2023/0328348 | A1* | 10/2023 | Pantelidis | H04N 23/687 |
| | | | | 348/208.11 |
| 2024/0160032 | A1* | 5/2024 | Eddington | G03B 5/00 |

\* cited by examiner

*Primary Examiner* — Darryl J Collins
*Assistant Examiner* — Matthew Y Lee
(74) *Attorney, Agent, or Firm* — W&G Law Group (57) ABSTRACT

An optical driving assembly includes an optical element having an optical axis, an optical sensor, and a driving module driving optical sensor to translate along a direction perpendicular to the optical axis. The driving module includes a fixation member provided with a moving cavity, a moving member provided in the first moving cavity and movably connected to the fixation member along a first direction and provided with a second moving cavity, a supporting member provided in the second moving cavity and movably connected to the moving member along a second direction and supporting the optical sensor, and first and second driving assemblies. The first and second driving assemblies include first and second shape memory alloy wires. The optical sensor can linearly move in two directions perpendicular to the optical axis, achieving optical image stabilization and independent movements in two directions that are not affected by each other.

10 Claims, 10 Drawing Sheets

OPTICAL DRIVING ASSEMBLY

TECHNICAL FIELD

The present disclosure relates to the technical field of optical imaging apparatus, and in particular, to an optical driving assembly.

BACKGROUND

The optical image stabilization (OIS) solution for smart electronic devices in the related art is mainly achieved by driving the lens through a voice coil motor (VCM) to perform angle correction. However, such solution has disadvantages, such as high power consumption, limited optical image stabilization effect, large product volume, and high unit price.

Therefore, it is necessary to provide an optical driving assembly to solve the above defects.

SUMMARY

An objective of the present disclosure is to provide an optical driving assembly. The optical image stabilization can be achieved by cooperating a fixation member, a moving member, a supporting member, and an optical sensor with a first shape memory alloy (SAM) wire and a second SAM wire when an optical sensor of the optical drive assembly moves.

An aspect of the present disclosure provides an optical driving assembly. The optical driving assembly includes an optical element having an optical axis, an optical sensor, and a driving module configured to drive the optical sensor to translate in a direction perpendicular to the optical axis. The optical sensor and the optical element are arranged along the optical axis. The driving module includes a fixation member, a moving member, a supporting member, a first driving assembly, and a second driving assembly. A first moving cavity is provided inside the fixation member. The moving member is provided in the first moving cavity, and is movably connected to the fixation member along a first direction, and a second moving cavity is provided inside the moving member. The supporting member is provided in the second moving cavity, movably connected to the moving member along a second direction, and configured to support the optical sensor. The first driving assembly includes first shape memory alloy wires, each of which is connected the fixation member and the moving member. The second driving assembly includes second shape memory alloy wires, each of which is connected to the moving member and the supporting member. The first direction and the second direction each are perpendicular to the optical axis.

As an improvement, the first shape memory alloy wires include two first shape memory alloy wires disposed at two sides of the fixation member along the first direction, and each of the two first shape memory alloy wires includes at least two first fixation ends that are spaced apart from each other and connected to the fixation member, and a first connection end that is sandwiched between two adjacent first fixation ends of the at least two first fixation ends and connected to the moving member. The second shape memory alloy wires include two second shape memory alloy wires disposed at two sides of the moving member along the second direction, and each of the two second shape memory alloy wires includes at least two second fixation ends that are spaced apart from each other and connected to the moving member, and a second connection end that is sandwiched between two adjacent second fixation ends of the at least two second fixation ends and connected to the supporting member.

As an improvement, the first connection end is provided on a symmetry axis between the two adjacent first fixation ends, and the second connection end is provided on a symmetry axis between the two adjacent second fixation ends.

As an improvement, the optical driving assembly further includes a first wire-binding clamp provided on the fixation member, a first wire-hooking part provided on the moving member, a second wire-binding clamp provided on the moving member, and a second wire-hooking part provided on the supporting member. The at least two first fixation ends are fixedly connected to the first wire-binding clamps, the first connection end is connected to the first wire-hooking part, the at least two second fixation ends are fixedly connected to the second wire-binding clamps, and the second connection end is connected to the second wire-hooking part.

As an improvement, the first wire-hooking part includes a first wire-hooking post fixedly connected to the moving member, and a first anti-dropping portion provided on a side of the first wire-hooking post away from the moving member. An area of an orthographic projection of the first anti-dropping portion on the moving member is greater than an area of an orthographic projection of the first hooking post on the moving member. The second wire-hooking part includes a second wire-hooking post fixedly connected to the supporting member and a second anti-dropping portion provided on a side of the second wire-hooking post away from the supporting member. An area of an orthographic projection of the second anti-dropping portion on the supporting member is greater than an area of an orthographic projection of the second hooking post on the supporting member. One of the two first shape memory alloy wires is hooked onto the first wire-hooking post through the first connection end, and one of the two second shape memory alloy wires is hooked onto the second wire-hooking post through the second connection end.

As an improvement, the moving member is slidably connected to the fixation member, a first sliding groove extending along the first direction is provided at the moving member, and a first sliding block slidably connected to the first sliding groove is provided on the fixation member. The supporting member is slidably connected to the moving member, a second sliding groove extending along the second direction is provided at the supporting member, and a second sliding block slidably connected to the second sliding groove is provided on the moving member.

As an improvement, the driving module further includes a flexible printed circuit board and an etching board that are stacked and connected to the optical sensor, an orthographic projection of the etching board along the optical axis of the optical element overlaps with the flexible printed circuit board, the flexible printed circuit board includes an inner frame connected to the optical sensor, an outer frame sleeved outside of the inner frame and spaced apart from the inner frame, and an elastic arm connected between the inner frame and the outer frame.

As an improvement, the inner frame includes two first borders each extending along the first direction and two second borders each extending along the second direction, the outer frame includes two third borders parallel to the first borders and two fourth borders parallel to the second borders, a first convex edge is provided on each of the two second borders and extends toward one of the two fourth border that is adjacent to the second border, and a second convex edge is provided on each of the two third borders and extends toward one of the two first borders that is adjacent to the third border. One of the first convex edges of the two second borders and one of the second convex edges of the two third borders are adjacent to each other and connected by the elastic arm.

As an improvement, the optical sensor includes an optical sensor body, a composite ceramic plate fixed to the optical sensor body, and an optical sensor bracket, and the inner frame is sandwiched between the composite ceramic plate and the optical sensor bracket.

As an improvement, one of the two first shape memory alloy wires is electrically connected to one of the first wire-binding clamp, one of the two second shape memory alloy wires is electrically connected to one of the second wire-binding clamps, and the first wire-binding clamps and the second wire-binding clamps are electrically connected to the flexible printed circuit board.

An optical driving assembly is provided. The optical driving assembly includes an optical element having an optical axis, an optical sensor, and a driving module configured to drive the optical sensor to translate along a direction perpendicular to the optical axis. The optical sensor and the optical element are arranged along the optical axis. The driving module includes a fixation member, a moving member, a supporting member, a first driving assembly, and a second driving assembly. A first moving cavity is provided inside the fixation member. The moving member is provided in the first moving cavity, and is movably connected to the fixation member along a first direction, and a second moving cavity is provided inside the moving member. The supporting member is provided in the second moving cavity, movably connected to the moving member along a second direction, and configured to support the optical sensor. The first driving assembly includes first shape memory alloy wires that connect the fixation member with the moving member. The second driving assembly includes second shape memory alloy wires that connect the moving member with the supporting member. The first direction and the second direction are perpendicular to the optical axis. In this way, the optical sensor can linearly move in two directions perpendicular to the optical axis, so that the optical image stabilization can be achieved while the movement of the optical sensor in two directions can be independently controlled and will not be affected by each other.

DESCRIPTION OF REFERENCE NUMERALS

100: optical driving assembly; 1: optical element; 2: optical sensor; 21: composite ceramic plate; 22: optical sensor bracket; 23: optical sensor body; 3: driving module; 31: fixation member; 311: first moving cavity; 312: first sliding block; 313: first protrusion; 314: first fixation side edge; 315: second fixation side edge; 32: moving member; 321: second moving cavity; 322: first sliding groove; 323: second sliding block; 324: first moving side edge; 325: second moving side edge; 33: supporting plate; 331: opening; 332: second sliding groove; 333: third moving side edge; 334: fourth moving side edge; 335: second protrusion; 34: first driving assembly; 341: first shape memory alloy wire; 3411: first fixation end; 3412: first connection end; 342: first wire-binding clamp; 343: first wire-hooking part; 3431: first wire-hooking post; 3432: first anti-dropping portion; 35: second driving assembly; 351: second shape memory alloy wire; 3511: second fixation end; 3512: second connection end; 352: second wire-binding clamp; 353: second wire-hooking part; 3531: second wire-hooking post; 3532: second anti-dropping portion; 36: flexible printed circuit board; 361: inner frame; 3611: first border; 3612: second border; 3613: first convex edge; 362: outer frame; 3621: third border; 3622: fourth border; 3623: second convex edge; 363: elastic arm; 37: etching board; 01: optical axis; 02: first direction; 03: second direction.

DESCRIPTION OF EMBODIMENTS

The present disclosure will be further described below in conjunction with the drawings and embodiments.

Figure 1:
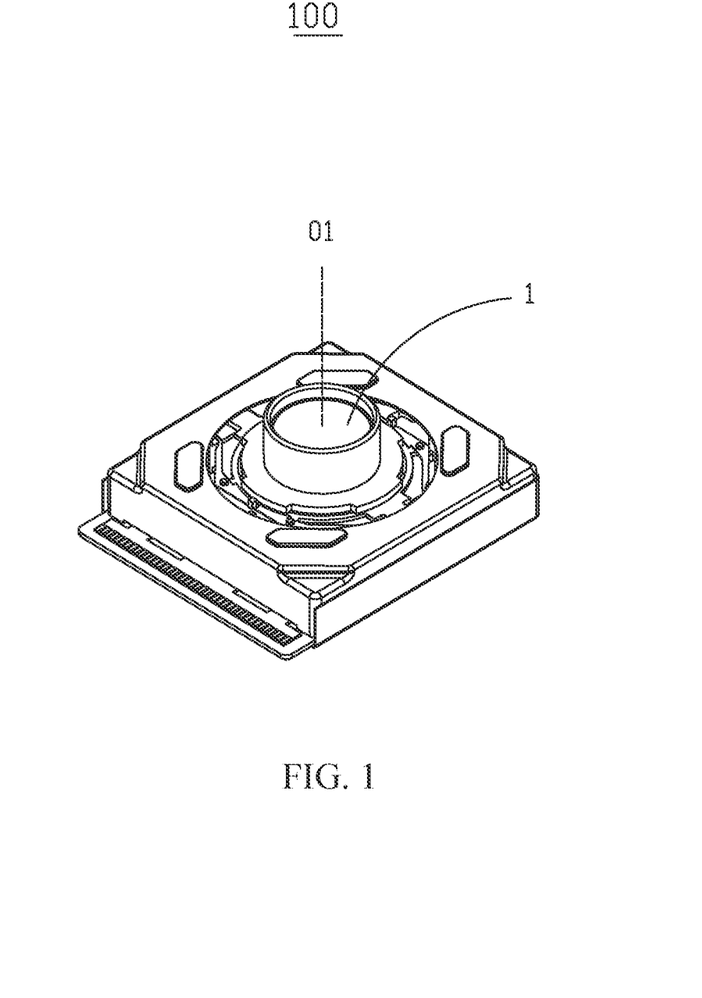
FIG. 1 is a schematic diagram showing an optical driving assembly according to an embodiment of the present disclosure.
Figure 2:
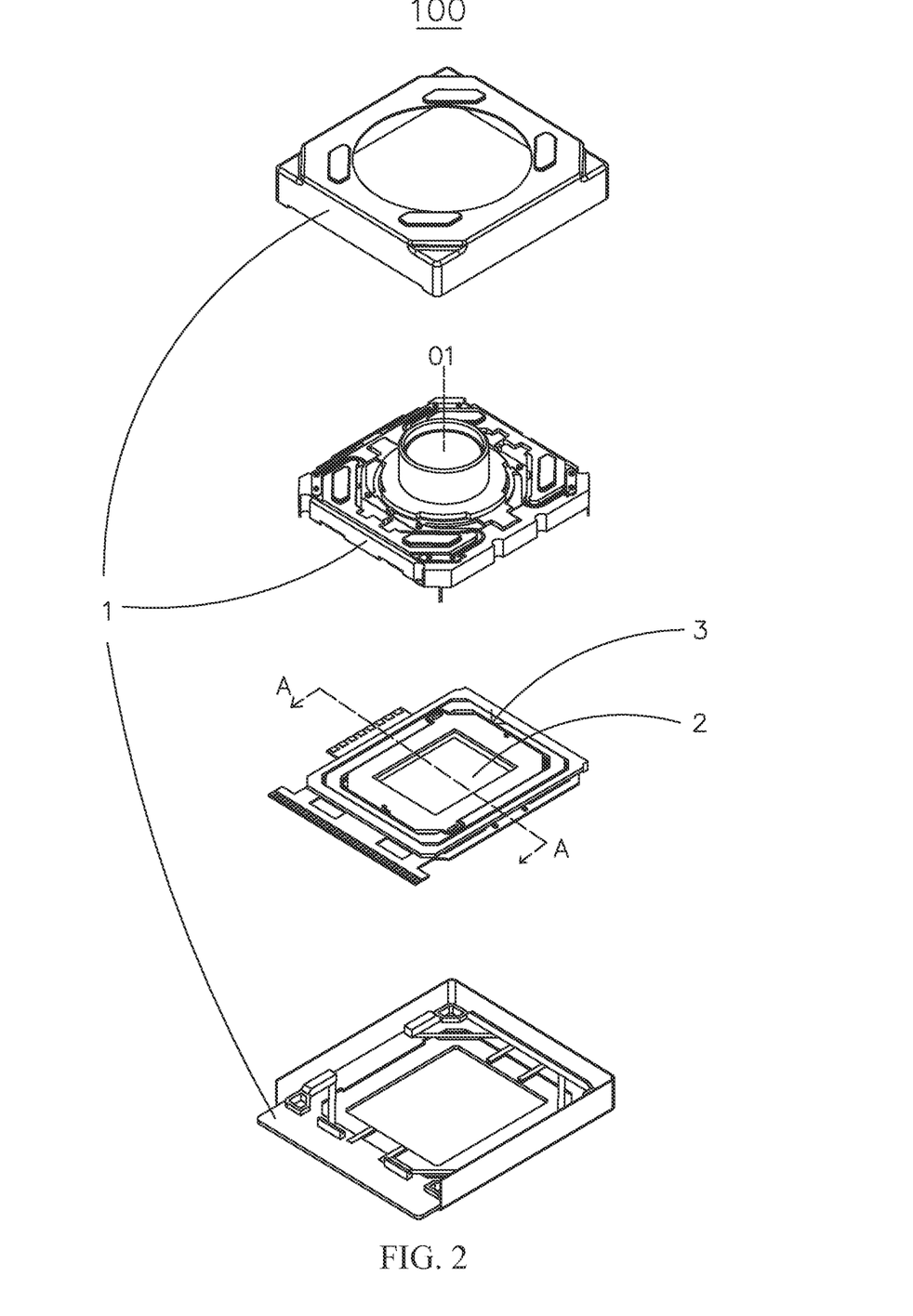
FIG. 2 is an exploded view of the optical driving assembly shown in FIG. 1 according to an embodiment of the present disclosure.
Figure 3:
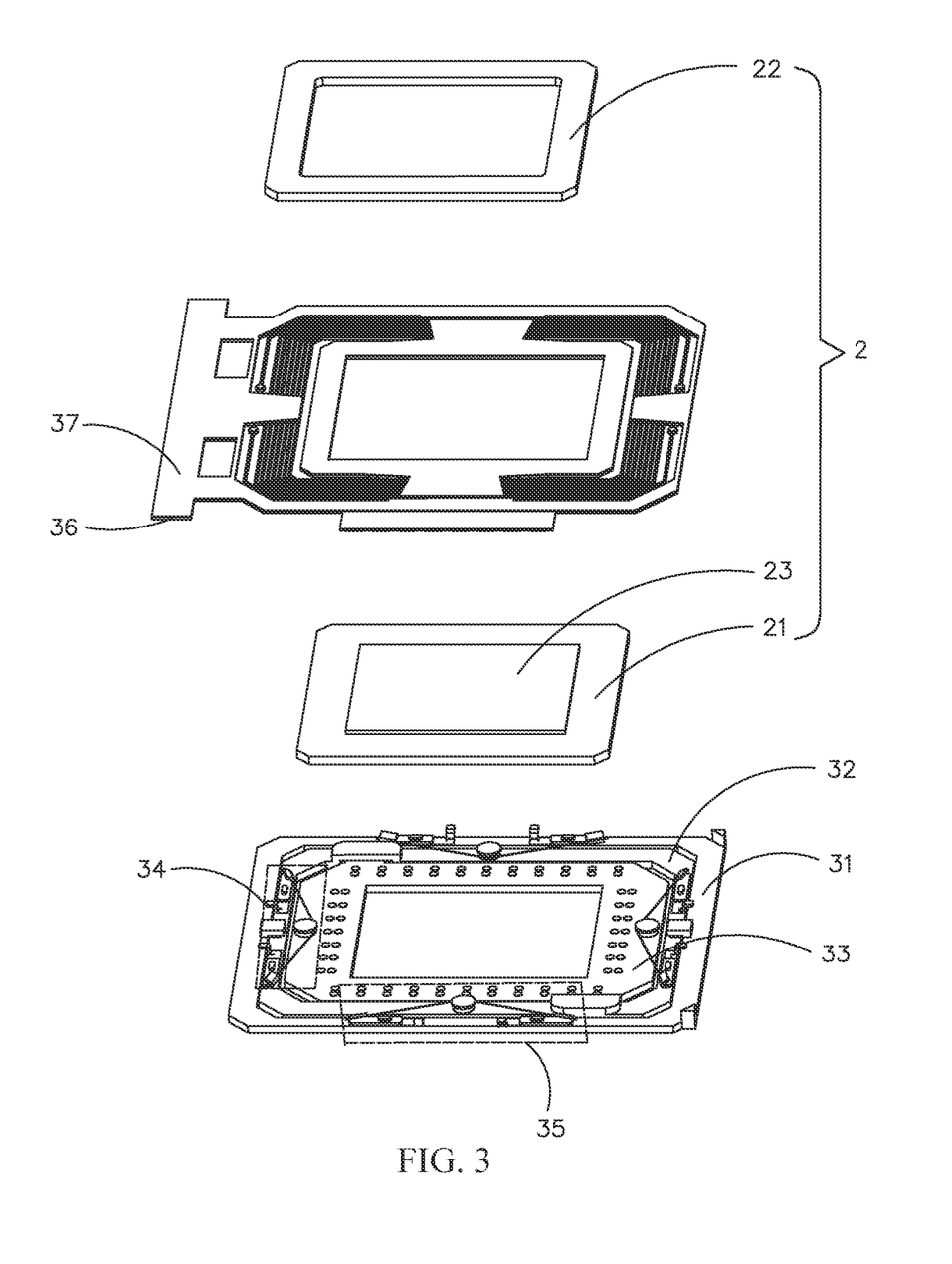
FIG. 3 is an inverted exploded view of the driving module shown in FIG. 2 according to an embodiment of the present disclosure.
Figure 4:
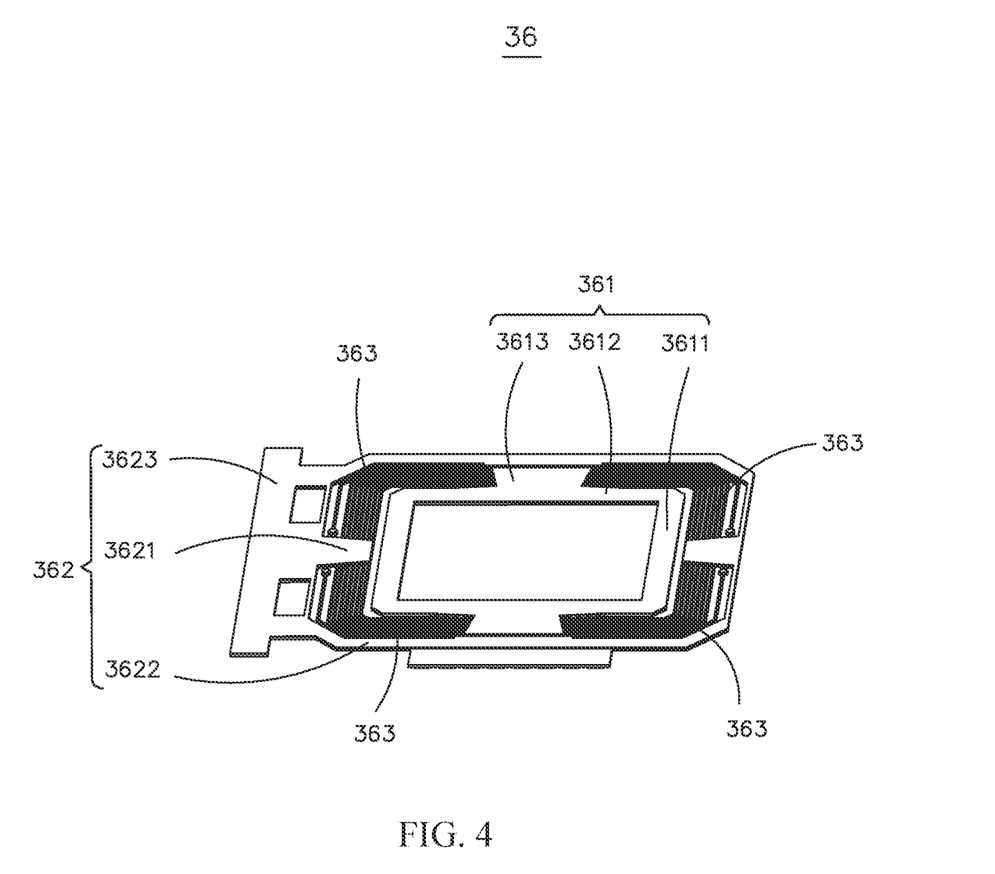
FIG. 4 is a schematic diagram showing an flexible printed circuit board shown in FIG. 3 according to an embodiment of the present disclosure.
Figure 5:
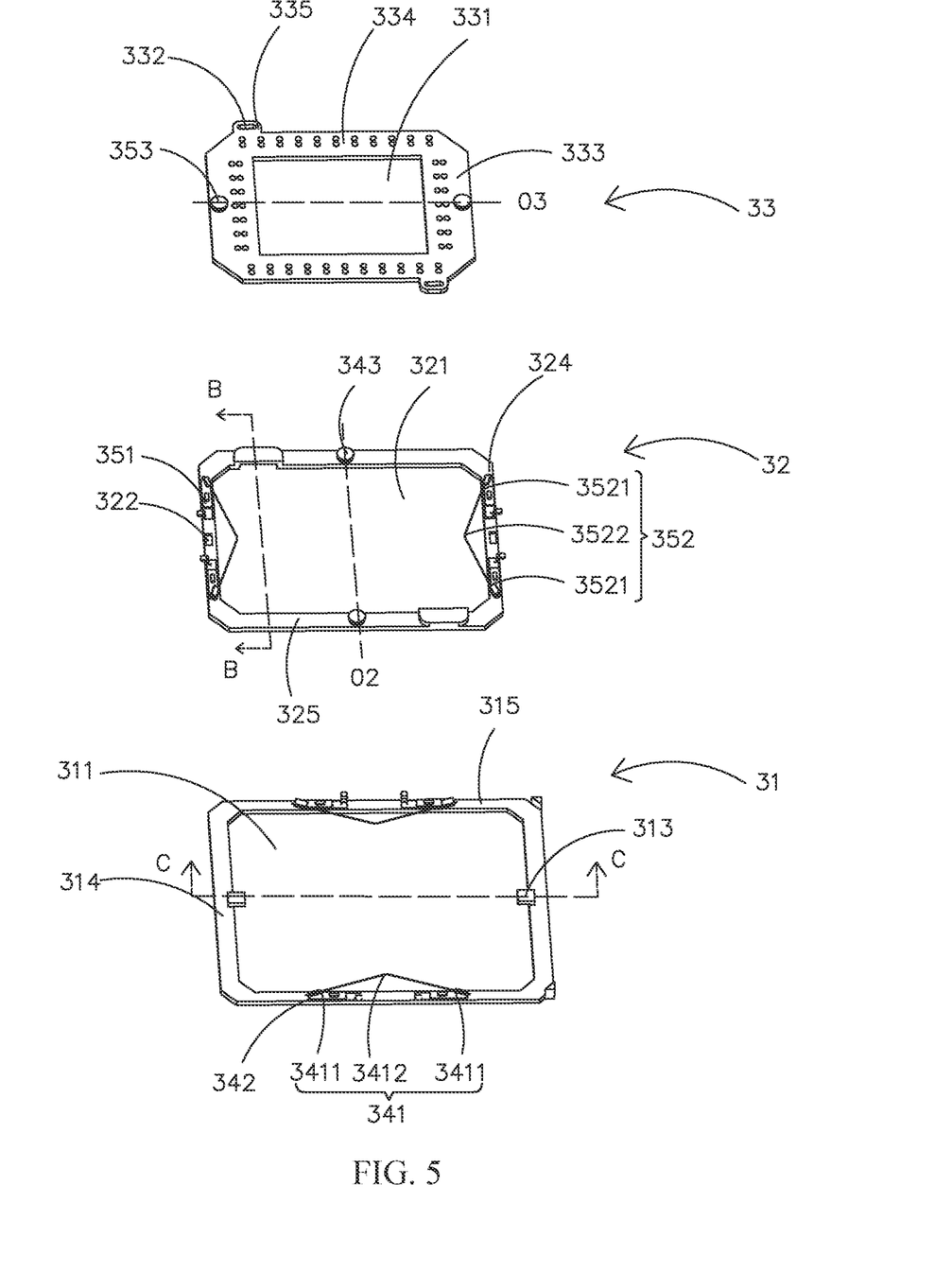
FIG. 5 is an inverted exploded view of a fixation member, a moving member, a supporting member, a first driving assembly, and a second driving assembly that are shown in FIG. 2 according to an embodiment of the present disclosure.
Figure 6:
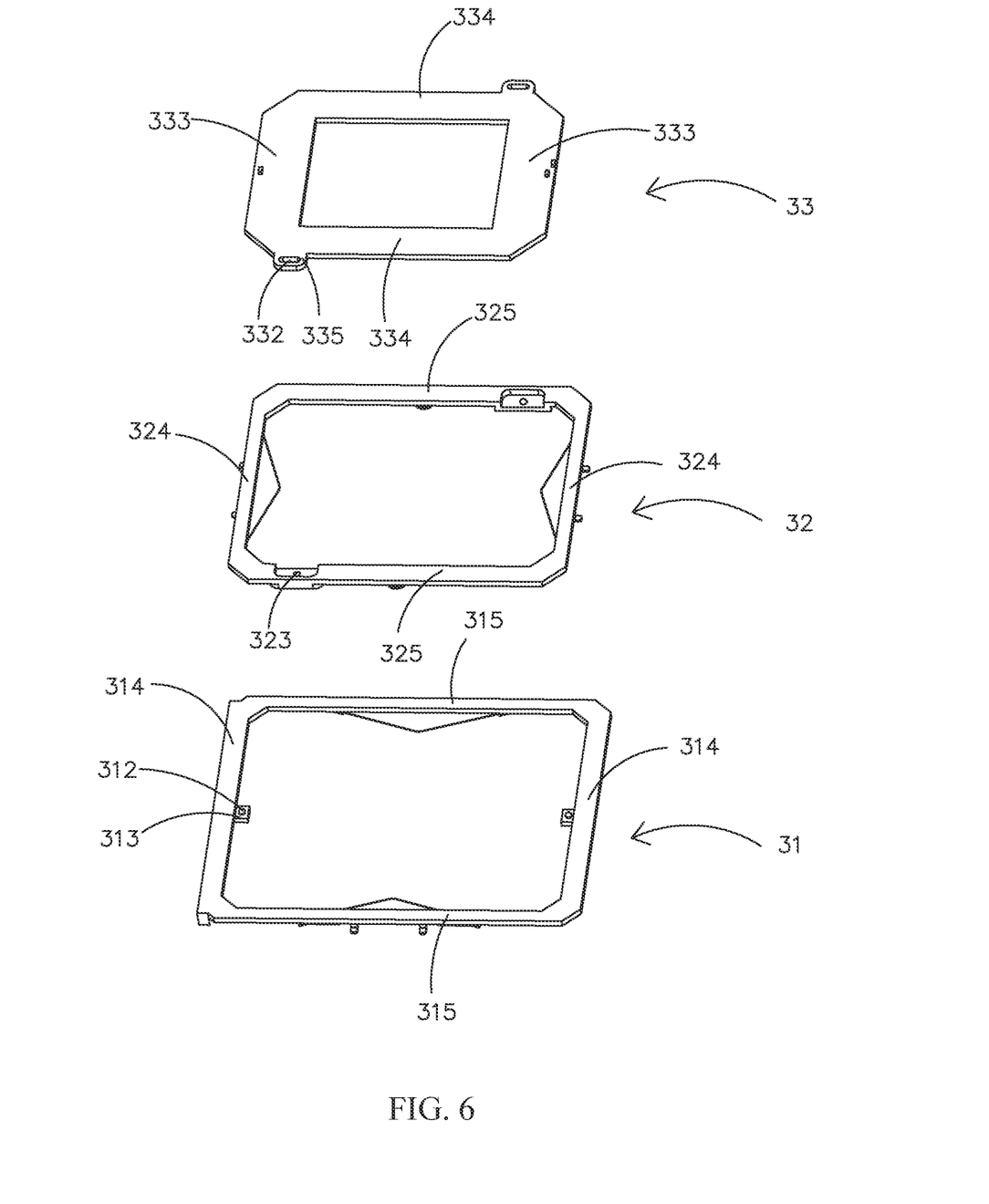
FIG. 6 is a cross-sectional view of the moving member and the supporting plate that are shown in FIG. 5 along line B-B according to an embodiment of the present disclosure.
Figure 7:
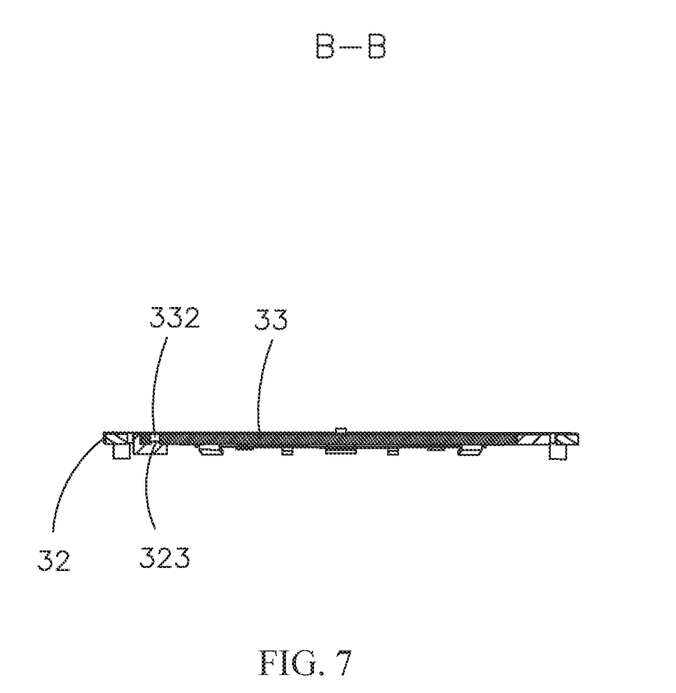
FIG. 7 is a cross-sectional view of the fixation member and the moving member that are shown in FIG. 5 along line C-C according to an embodiment of the present disclosure.
Figure 8:
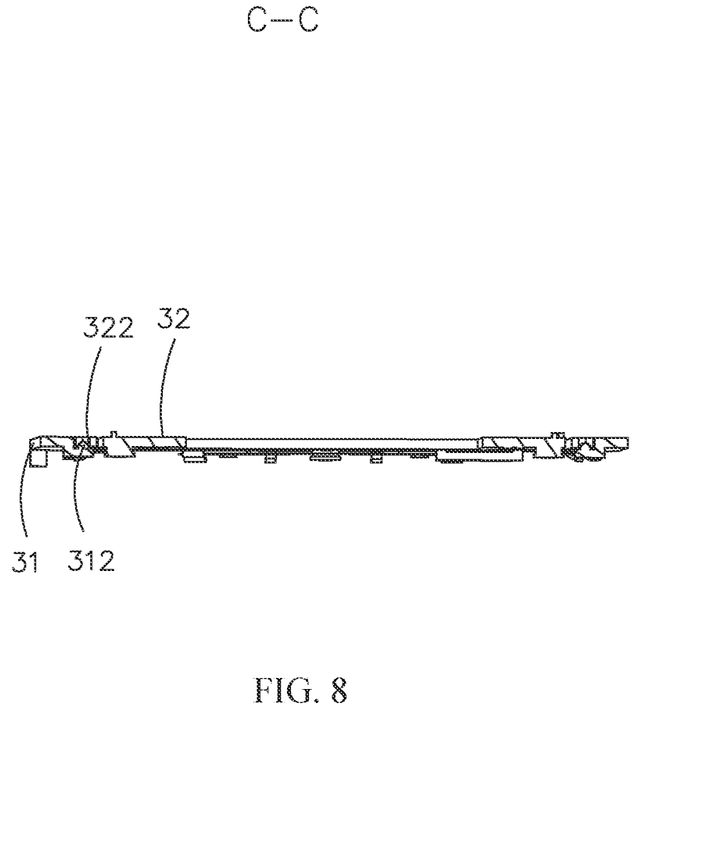
FIG. 8 is an exploded view of a fixation member, a moving member, a supporting member, a first driving assembly, and a second driving assembly that are shown in FIG. 2 according to an embodiment of the present disclosure.
Figure 9:
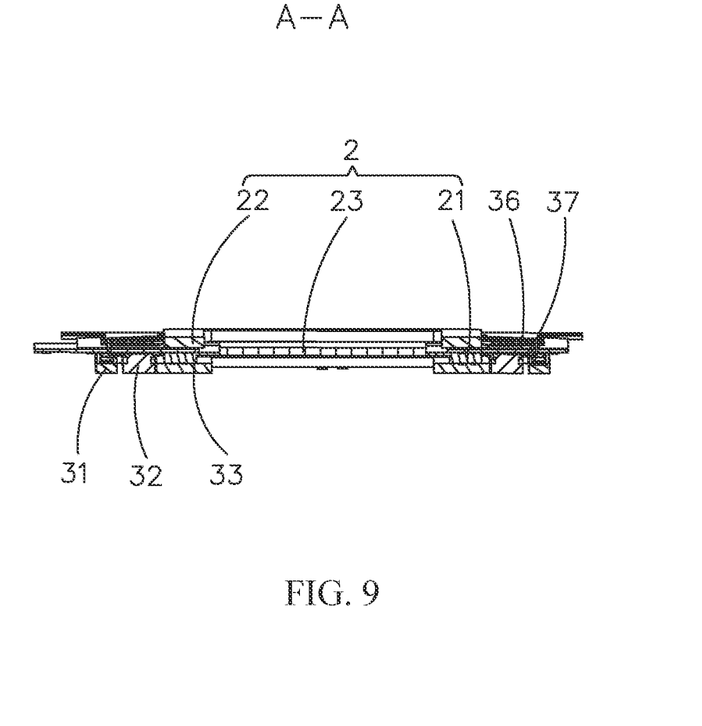
FIG. 9 is a cross-sectional view of a driving module and a base along line A-A according to an embodiment of the present disclosure.
Figure 10:
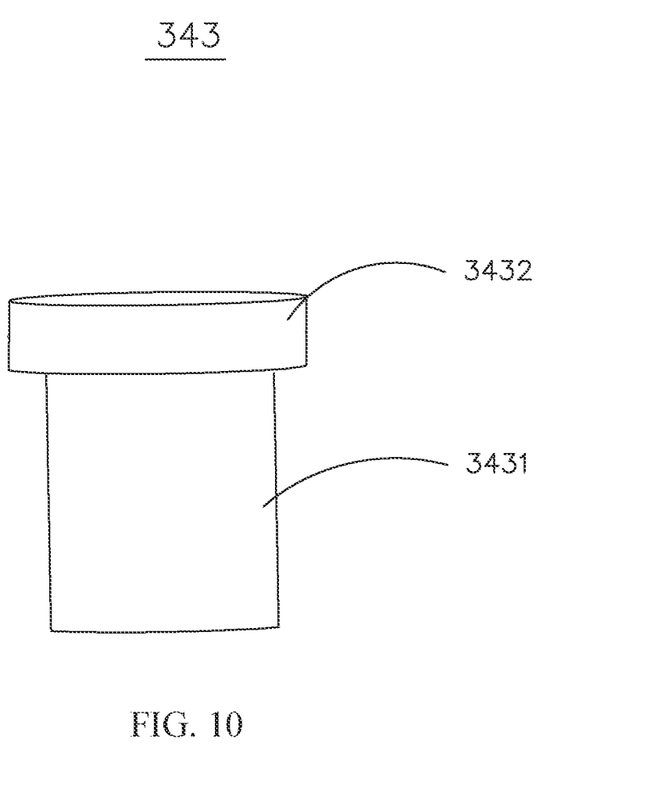
FIG. 10 is a schematic diagram showing a first hooking portion shown in FIG. 5 according to an embodiment of the present disclosure.

Referring to FIG. 1 to FIG. 10, an embodiment of the present disclosure provides an optical driving assembly 100. The optical driving assembly 100 includes an optical element 1, an optical sensor 2 and a driving module 3. The optical element 1 has an optical axis 01. The optical sensor 2 and the optical element 1 are arranged along the optical axis 01. The driving module 3 is configured to drive the optical sensor 2 to translate along a direction perpendicular to the optical axis 01.

The driving module 3 includes a fixation member 31, a moving member 32, a supporting member 33, a first driving assembly 34, and a second driving assembly 35. The fixation member 31, the moving member 32, and the supporting member 33 are all rectangular frames, and the optical sensor 2 is of a rectangle shape. A first moving cavity 311 is provided inside the fixation member 31. The moving member 32 is accommodated in the first moving cavity 311. The supporting member 33 is accommodated in the second moving cavity 321. The optical sensor 2 is provided on a vertical supporting member 33. An orthographic projection of a sensor body 21 of the optical sensor 2 falls into an opening 331, so that the sensor body 21 directly faces the opening 331. From outside to inside, the fixation member 31 is sleeved outside of the moving member 32, and the moving member 32 is sleeved outside of the supporting member 33. The moving member 32 is movably connected to the fixation member 31. The supporting member 33 is movably connected to the moving member 32. The optical sensor 2 is connected to the supporting member 33. The moving member 32 can slide on the fixation member 31 along the first direction 02, but is relatively fixed on the fixation member 31 along the second direction 03. The supporting member 33 can slide on the moving member 32 along the second direction 03, but the supporting member 33 is relatively fixed on the moving member 32 along the first direction 02. The first direction 02 is perpendicular to the second direction 03. The first direction 02 and the second direction 03 each are perpendicular to the optical axis 01.

In the optical driving assembly 100 of the embodiments of the present disclosure, a current is supplied to two first shape memory alloy wires 341, so that the first shape memory alloy wires 341 shrink. Since the fixation member 31 is fixed, the moving member 32 can linearly move on the fixation member 31 along the first direction 02. Since the supporting member 33 and the moving member 32 are relatively fixed in the first direction 02, the supporting member 33 is driven to move together, meanwhile, the optical sensor 2 connected to the supporting member 33 is driven to linearly move along the first direction 02. The current is supplied to two second shape memory alloy wires 351, so that the second shape memory alloy wires 351 shrink. Since the fixation member 31 is fixed, and the moving member 32 is fixed on the fixation member 31 in the second direction 03 relative to the fixation member 31, so that the supporting member 33 can linearly move on the moving member 32 fixed outside the supporting member 33 along the second direction 03, and the optical sensor 2 connected to the supporting member 33 is driven to linearly move in the second direction 03. In this way, the movement of the optical sensor 2 in the first direction 02 and the movement of the optical sensor 2 in the second direction 03 can be independently controlled, and will not be affected by each other. The combination of linear movement of the optical sensor 2 in the first direction 02 and linear movement of the optical sensor 2 in the second direction 03 can drive the optical sensor 2 to move in a plane perpendicular to the optical axis 01, thereby achieving optical image stabilization.

The first driving assembly 34 is provided on the fixation member 31 and the moving member 32 and configured to drive the moving member 32 to move linearly along the first direction 02. The second driving assembly 35 is provided on the moving member 32 and the supporting member 33 and configured to drive the supporting member 33 to move linearly in the second direction 03. The first driving assembly 34 includes two first shape memory alloy wires 341. The two first shape memory alloy wires 341 are symmetrically distributed at two sides of the fixation member 31 along the first direction 02 and symmetrically distributed at two sides of the moving member 32 along the first direction 02. The second driving assembly 35 includes two second shape memory alloy wires 351. The two second shape memory alloy wires 351 are symmetrically distributed at two sides of the moving member 32 along the first direction 02 and symmetrically distributed at two sides of the supporting member 33 along the second direction 03. In an embodiment of the present disclosure, each first shape memory alloy wire 341 includes at least two first fixation ends 3411 spaced apart from each other and connected to the fixation member, and a first connection end 3412 sandwiched between two adjacent first fixation ends 3411 and connected to the moving member 32. Each second shape memory alloy wire 351 includes at least two second fixation ends 3511 spaced apart from each other and connected to the moving member 32, and a second connection end 3512 sandwiched between two adjacent second fixation ends 3511 and connected to the supporting member 33. In an embodiment of the present disclosure, the first connection end 3412 is provided on a symmetry axis between two adjacent first fixation ends 3411, and the second connection end 3512 is provided on a symmetry axis between two adjacent second fixation ends 3511.

When connecting the fixation member 31 with the moving member 32, each first shape memory alloy wire 341 is U-shaped or V-shaped. When connecting the moving member 32 with the supporting member 33, each second shape memory alloy wire 351 is U-shaped or V-shaped.

In an embodiment of the present disclosure, the optical driving assembly 100 further includes a first wire-binding clamp 342 provided on the fixation member 31, a first wire-hooking part 343 provided on the moving member 32, a second wire-binding clamp 352 provided on the moving member 32, and a second wire-hooking part 353 provided on the supporting member 33. The first fixing end 3411 is fixedly connected to the first wire-binding clamp 342. The first connection end 3412 is connected to the first wire-hooking part 343. The second fixing end 3531 is fixedly connected to the second wire-binding clamp 352. The second connection end 3532 is connected to the second wire-hooking part 353.

The first hooking component 343 includes a first hooking post 3431 fixedly connected to the moving member, and a first anti-dropping portion 3432 provided on a side of the first hooking post 3431 away from the moving member 32. An area of an orthographic projection of the first anti-dropping portion 3432 on the moving member 32 is greater than an area of an orthographic projection area of the first wire hooking post 3431 on the moving member 32. The second wire-hooking part 353 includes a second wire hooking post 3531 fixedly connected to the supporting member 33, and a second anti-dropping portion 3532 provided on a side of the second wire-hooking post 3531 away from the supporting member 33. An area of an orthographic projection of the second anti-dropping portion 3532 on the supporting member 33 is greater than an area of an orthographic projection of the second wire-hooking post 3531 on the supporting member 33, so that the location of the first shape memory alloy wire 341 or the location of the second shape memory alloy wire 351 can be limited, thereby preventing the first shape memory alloy wire 341 or the second shape memory alloy wire 351 from dropping. The first shape memory alloy wire 341 is hooked onto the first wire-hooking post 3431 through the first connection end 3412, and the second shape memory alloy wire 351 is hooked onto the second wire-hooking post 3531 through the second connection end 3512. In an embodiment of the present disclosure, the first wire-hooking part 343 or the second wire-hooking part 353 can be made of a metal material, such as copper-nickel-zinc alloy, titanium copper, beryllium copper, phosphor bronze, or nickel-plated or tin-plated stainless steel.

In an embodiment of the present disclosure, the moving member 32 is slidably connected to the fixation member 31 along the first direction 02, and a first sliding groove 322 extending along the first direction 02 is provided at the moving member 32. A first sliding block 312 slidably connected to the first sliding groove 322 is provided on the fixation member 31. The supporting member 33 is slidably connected to the moving member 32 along the second direction 03. A second sliding groove 332 extending along the second direction 03 is provided at the supporting member 33. A second sliding block 323 slidably connected to the second sliding groove 332 is provided on the moving member 32.

The fixation member 31, the moving member 32 and the supporting member 33 can be rectangular frames. The fixation member 31 includes two first fixation side edges 314 opposite to each other, and two second fixation side edges 315 opposite to each other. The first fixation side edge 314 and the second fixation side edge 315 are perpendicular to each other. The moving member 32 includes two first moving side edges 324 opposite to each other, and two second moving side edges 325 opposite to each other. The first moving side edge 324 and the second moving side edge 325 are perpendicular to each other. The supporting member 33 includes two third moving side edges 333 opposite to each other, and two fourth moving side edges 334 opposite to each other. The third moving side edge 333 and the fourth moving side edge 334 are perpendicular to each other. The first fixation side edge 314, the first moving side edge 324, and the third moving side edge 333 are adjacent to one another. The second fixation side edge 315, the second moving side edge 325, and the fourth moving side edge 334 are adjacent to one another. A first protrusion 313 is provided on each first fixation side edge 314 and extends toward the first moving side edge 324. The first moving side edge 324 is provided with a corresponding first sliding groove 322 extending along the first direction 02. The first protrusion 313 is provided with a first sliding block 312 bending and extending toward the first sliding groove 322. The first sliding block 312 is slidably fitted with the first sliding groove 322, so that the moving member 32 can slide relative to the fixation member 31 along the first direction 02, and is fixed relative to the fixation member 31 along the second direction 03. A second protrusion 335 is provided on each fourth moving side edge 334 and extends toward the second moving side edge 325. The second protrusion 335 is provided with a second sliding groove 332 extending along the second direction 03. The fourth moving side edge 334 is provided with a second sliding block 323 corresponding to the second sliding groove 332. The second sliding block 323 is slidably fitted with the second sliding groove 332, so that the supporting member 33 can be slideable relative to the first moving member 32 in the second direction 03, and is fixed relative to the moving member 32 in the first direction 02. In the embodiments of the present disclosure, the interconnections between the fixation member 31, the moving member 32, and the supporting member 33 can adopt the sliding block and the sliding groove to achieve movable connections therebetween, so that it is avoided that spherical connection structure is employed in the driving module 3, thereby greatly reducing the thickness of the driving module 3.

In an embodiment of the present disclosure, the driving module 3 further includes a flexible printed circuit board 36 and an etching board 37 stacked on a bottom of the flexible printed circuit board 36. An orthographic projection of the etching board 37 along the optical axis 01 completely overlaps with the flexible printed circuit board 36. The etching board 37 has a same shape and structure as the flexible printed circuit board 36. The etching board is in contact with the flexible printed circuit board 36 to form one piece. The optical sensor 2 includes an optical sensor body 23, a composite ceramic plate 21 for fixedly supporting the optical sensor body 23, and an optical sensor bracket 22. The composite ceramic plate 21 is a rectangular frame. The etching board 37 and the flexible printed circuit board 36 are sandwiched between the composite ceramic plate 21 and the optical sensor bracket 22, so that the etching board 37 and the flexible printed circuit board 36 are connected to the optical sensor 2. The etching board 37 is stacked on the flexible printed circuit board 36, so that the fixation member 31, the moving member 32, the supporting member 33, and the optical sensor 2 that are provided on the flexible printed circuit board 36 can be effectively supported.

In an embodiment of the present disclosure, the flexible printed circuit board 36 includes an inner frame 361 connected to the optical sensor 2, an outer frame 362 sleeved outside of an inner frame 361 and spaced apart from the inner frame 361, and an elastic arm 363 connected between the inner frame 361 and the outer frame 362. The inner frame 361 includes two first borders 3611 each extending along the first direction 02 and two second borders 3612 each extending along the second direction 03. The outer frame 362 includes two first borders 3611 parallel to the first border 3611, and two fourth borders 3622 parallel to the second border 3612. Each second border 3612 is provided with a first convex edge 3623 extending toward its adjacent fourth border 3622. Each third border 3621 is provided with a second convex edge 3613 extending toward its adjacent first border 3611. The number of first convex edges 3623 and the number of second convex edges 3613 are both two, and the two first convex edges 3623 and second the two convex edges 3613 form a rectangle. There are four groups of elastic arms 363, each of which connects the first convex edge 3611 with the second convex edge 3613 adjacent to the first convex edge 3611. An elastic force of the elastic arm 363 can be set, so that the optical sensor 2 can be reset after moving along the first direction 02 or the second direction 03.

In an embodiment of the present disclosure, the first shape memory alloy wire 341 is electrically connected to the first wire-binding clamp 342, the second shape memory alloy wire 351 is electrically connected to the second wire-binding clamp 352, and the first wire-binding clamp 342 and the second wire-binding clamp 352 are electrically connected to the flexible printed circuit board 36.

The above are merely some embodiments of the present disclosure. It should be noted that for those skilled in the art, modifications can be made without departing from the inventive concept of the present disclosure, but these all fall into the protection scope of the present disclosure.

What is claimed is:
1. An optical driving assembly, comprising:
   an optical element having an optical axis;
   an optical sensor, wherein the optical sensor and the optical element are arranged along the optical axis; and
   a driving module configured to drive the optical sensor to translate along a direction perpendicular to the optical axis,
   wherein the driving module comprises a fixation member, a moving member, a supporting member, a first driving assembly, and a second driving assembly;
   a first moving cavity is provided inside the fixation member;

the moving member is provided in the first moving cavity, and is movably connected to the fixation member along a first direction, and a second moving cavity is provided inside the moving member;

the supporting member is provided in the second moving cavity, is movably connected to the moving member along a second direction, and is configured to support the optical sensor;

the first driving assembly comprises first shape memory alloy wires, each of which is connected to the fixation member and the moving member;

the second driving assembly comprises second shape memory alloy wires, each of which is connected to the moving member and the supporting member; and the first direction and the second direction each are perpendicular to the optical axis.

2. The optical driving assembly as described in claim 1, wherein the first shape memory alloy wires comprise two first shape memory alloy wires disposed at two sides of the fixation member along the first direction, and each of the two first shape memory alloy wires comprises at least two first fixation ends that are spaced apart from each other and connected to the fixation member, and a first connection end that is sandwiched between two adjacent first fixation ends of the at least two first fixation ends and connected to the moving member; and the second shape memory alloy wires comprise two second shape memory alloy wires disposed at two sides of the moving member along the second direction, and each of the two second shape memory alloy wires comprises at least two second fixation ends that are spaced apart from each other and connected to the moving member, and a second connection end that is sandwiched between two adjacent second fixation ends of the at least two second fixation ends and connected to the supporting member.

3. The optical driving assembly as described in claim 2, wherein the first connection end is provided on a symmetry axis between the two adjacent first fixation ends, and the second connection end is provided on a symmetry axis between the two adjacent second fixation ends.

4. The optical driving assembly as described in claim 2, further comprising:

first wire-binding clamps provided on the fixation member;

a first wire-hooking part provided on the moving member;

second wire-binding clamps provided on the moving member; and a second wire-hooking part provided on the supporting member, wherein the at least two first fixation ends are fixedly connected to the first wire-binding clamps, the first connection end is connected to the first wire-hooking part, the at least two second fixation ends are fixedly connected to the second wire-binding clamps, and the second connection end is connected to the second wire-hooking part.

5. The optical driving assembly as described in claim 4, wherein the first wire-hooking part comprises a first wire-hooking post fixedly connected to the moving member and a first anti-dropping portion provided on a side of the first wire-hooking post away from the moving member, wherein an area of an orthographic projection of the first anti-dropping portion on the moving member is greater than an area of an orthographic projection of the first hooking post on the moving member;

the second wire-hooking part comprises a second wire-hooking post fixedly connected to the supporting member and a second anti-dropping portion provided on a side of the second wire-hooking post away from the supporting member, wherein an area of an orthographic projection of the second anti-dropping portion on the supporting member is greater than an area of an orthographic projection of the second hooking post on the supporting member; and one of the two first shape memory alloy wires is hooked onto the first wire-hooking post through the first connection end, and one of the two second shape memory alloy wires is hooked onto the second wire-hooking post through the second connection end.

6. The optical driving assembly as described in claim 1, wherein the moving member is slidably connected to the fixation member, a first sliding groove extending along the first direction is provided at the moving member, and a first sliding block slidably connected to the first sliding groove is provided on the fixation member; and the supporting member is slidably connected to the moving member, a second sliding groove extending along the second direction is provided at the supporting member, and a second sliding block slidably connected to the second sliding groove is provided on the moving member.

7. The optical driving assembly as described in claim 4, wherein the driving module further comprises a flexible printed circuit board and an etching board that are stacked and connected to the optical sensor, an orthographic projection of the etching board along the optical axis of the optical element overlaps with the flexible printed circuit board, the flexible printed circuit board comprises an inner frame connected to the optical sensor, an outer frame sleeved outside of the inner frame and spaced apart from the inner frame, and an elastic arm connected between the inner frame and the outer frame.

8. The optical driving assembly as described in claim 7, wherein the inner frame comprises two first borders each extending along the first direction and two second borders each extending along the second direction, the outer frame comprises two third borders parallel to the first borders and two fourth borders parallel to the second borders, a first convex edge is provided on each of the two second borders and extends toward one of the two fourth border that is adjacent to the second border, and a second convex edge is provided on each of the two third borders and extends toward one of the two first borders that is adjacent to the third border; and one of the first convex edges of the two second borders and one of the second convex edges of the two third borders are adjacent to each other and connected by the elastic arm.

9. The optical driving assembly as described in claim 7, wherein the optical sensor comprises an optical sensor body, a composite ceramic plate fixed to the optical sensor body, and an optical sensor bracket, wherein the inner frame is sandwiched between the composite ceramic plate and the optical sensor bracket.

10. The optical driving assembly as described in claim 7, wherein one of the two first shape memory alloy wires is electrically connected to one of the first wire-binding clamp, one of the two second shape memory alloy wires is electrically connected to one of the second wire-binding clamps, and the first wire-binding clamps and the second wire-binding clamps are electrically connected to the flexible printed circuit board.

\* \* \* \* \*